(12) United States Patent
Sung et al.

(10) Patent No.: US 9,995,269 B2
(45) Date of Patent: Jun. 12, 2018

(54) POWER CONVERTING APPARATUS

(71) Applicant: INGINE, INC., Yongsan-gu Seoul (KR)

(72) Inventors: Yongjun Sung, Guri-si (KR); Junghee Kim, Seoul (KR); Donggeon Lee, Seoul (KR)

(73) Assignee: INGINE, INC. (KR)

( * ) Notice: Subject to any disclaimer, the term of this patent is extended or adjusted under 35 U.S.C. 154(b) by 663 days.

(21) Appl. No.: 14/413,408

(22) PCT Filed: Apr. 21, 2014

(86) PCT No.: PCT/KR2014/003465
§ 371 (c)(1),
(2) Date: Jan. 7, 2015

(87) PCT Pub. No.: WO2015/016457
PCT Pub. Date: Feb. 5, 2015

(65) Prior Publication Data
US 2015/0275847 A1    Oct. 1, 2015

(30) Foreign Application Priority Data

Jul. 31, 2013 (KR) .................. 10-2013-0091243
Apr. 18, 2014 (KR) .................. 10-2014-0046679

(51) Int. Cl.
*F03B 13/18* (2006.01)
*F16D 43/208* (2006.01)
(Continued)

(52) U.S. Cl.
CPC ........ *F03B 13/1885* (2013.01); *F16D 43/208* (2013.01); *F16H 19/0622* (2013.01);
(Continued)

(58) Field of Classification Search
CPC .. F03B 13/1885; F03B 13/1895; F03B 13/22; F05B 2240/95; F05B 2240/97; Y02E 10/38
(Continued)

(56) References Cited

U.S. PATENT DOCUMENTS

| 332,875 A | 12/1885 | Bussard et al. |
|---|---|---|
| 755,799 A | 3/1904 | Schlueter |

(Continued)

FOREIGN PATENT DOCUMENTS

| CA | 2828198 A1 | 8/2012 |
|---|---|---|
| CN | 101997398 A | 3/2011 |

(Continued)

OTHER PUBLICATIONS

Korean Intellectual Property Office, "International Search Report" in connection with related PCT Patent Application No. PCT/KR2014/003465, dated Jun. 26, 2014, 4 pages.
(Continued)

*Primary Examiner* — Jorge Leon, Jr.
(74) *Attorney, Agent, or Firm* — Kolisch Hartwell, P.C.

(57) ABSTRACT

A power converting apparatus that may increase a generation efficiency by receiving a power from a power source, producing electricity by rotating an output shaft connected to a generator using a portion of the received power, accumulating a remaining portion of the received power in an energy storage device, and rotating the output shaft using the accumulated energy when a power is not transmitted from the power source, the power source that floats in the ocean, performs irregular motions in vertical and horizontal directions by waves within a predetermined range, and generates an intermittent linear power, is provided.

11 Claims, 5 Drawing Sheets

(51) Int. Cl.
*F16H 33/00* (2006.01)
*F16H 19/06* (2006.01)
*F16H 33/02* (2006.01)
*F03B 13/22* (2006.01)
*F16H 31/00* (2006.01)

(52) U.S. Cl.
CPC ............ *F16H 33/00* (2013.01); *F16H 33/02* (2013.01); *F03B 13/1895* (2013.01); *F03B 13/22* (2013.01); *F05B 2240/95* (2013.01); *F05B 2240/97* (2013.01); *F05B 2260/4031* (2013.01); *F05B 2260/42* (2013.01); *F16H 31/001* (2013.01); *Y02E 10/38* (2013.01); *Y10T 74/18152* (2015.01)

(58) Field of Classification Search
USPC .... 60/497, 499, 504, 505, 506, 507; 290/42, 290/53
See application file for complete search history.

(56) References Cited

U.S. PATENT DOCUMENTS

| | | | | |
|---|---|---|---|---|
| 4,170,738 | A * | 10/1979 | Smith | F03B 13/185 185/30 |
| 4,228,360 | A * | 10/1980 | Navarro | F03B 13/1885 290/43 |
| 5,424,582 | A | 6/1995 | Trepl, II et al. | |
| 7,045,912 | B2 | 5/2006 | Leijon et al. | |
| 7,347,309 | B2 | 3/2008 | Wiesneth et al. | |
| 2005/0121915 | A1 | 6/2005 | Leijon et al. | |
| 2007/0089409 | A1* | 4/2007 | Serrano Molina | F03B 13/1885 60/504 |
| 2008/0272600 | A1* | 11/2008 | Olson | F03B 13/1815 290/53 |
| 2009/0200806 | A1* | 8/2009 | Al-Huwaider | F03B 13/1865 290/53 |
| 2009/0212562 | A1* | 8/2009 | Jaugilas | F03B 13/26 290/42 |
| 2010/0064679 | A1 | 3/2010 | Straume | |
| 2010/0225115 | A1* | 9/2010 | Atanasov | F03B 13/1865 290/53 |
| 2011/0018275 | A1* | 1/2011 | Sidenmark | F03B 13/1815 290/53 |
| 2011/0031750 | A1 | 2/2011 | Kreissig | |
| 2013/0200626 | A1* | 8/2013 | Sidenmark | F03B 13/1885 290/53 |
| 2015/0035283 | A1* | 2/2015 | Lee | F03B 13/1885 290/53 |

FOREIGN PATENT DOCUMENTS

| | | |
|---|---|---|
| CN | 102016294 A | 4/2011 |
| CN | 102272442 A | 12/2011 |
| FR | 2339071 A1 | 8/1977 |
| JP | 52-82633 A | 6/1977 |
| JP | 55-040251 A | 3/1980 |
| JP | 63-18188 A | 1/1988 |
| JP | 63-97877 A | 4/1988 |
| JP | 05-038650 A | 2/1993 |
| JP | 2006-022873 A | 1/2006 |
| JP | 2006189018 A | 7/2006 |
| KR | 1020040026588 A | 3/2004 |
| KR | 101049518 B1 | 7/2011 |
| RU | 2447317 C2 | 4/2012 |
| WO | 2009105011 A1 | 8/2009 |
| WO | 2011126451 A1 | 10/2011 |
| WO | 2012098120 A2 | 7/2012 |
| WO | 2012115456 A2 | 8/2012 |
| WO | 2014055033 A1 | 4/2014 |

OTHER PUBLICATIONS

Korean Intellectual Property Office, "Written Opinion" in connection with related PCT Patent Application No. PCT/KR2014/003465, dated Jun. 26, 2014, 3 pages.

Canadian Intellectual Property Office, "Office action" in connection with related Canadian Patent Application No. 2,918,495, dated Dec. 5, 2016, 3 pages.

Russian Patent Office, "Search Report" in connection with related Russian Patent Application No. 2016106584, dated Jan. 31, 2017, 4 pages (no translation).

European Patent Office, "Extended European Search Report" in connection with related European Patent Application No. 14815209.3, dated Mar. 8, 2016, 7 pages.

* cited by examiner

POWER CONVERTING APPARATUS

TECHNICAL FIELD

Embodiments of the present invention relate to a power converting apparatus, and more particularly, to a power converting apparatus that may increase a generation efficiency by receiving a power from a power source, producing electricity by rotating an output shaft connected to a generator using a portion of the received power, accumulating a remaining portion of the received power in an energy storage device, and rotating the output shaft using the accumulated energy when a power is not transmitted from the power source, the power source that floats in the ocean, performs irregular motions by waves within a predetermined range, and generates an intermittent linear power.

BACKGROUND ART

A wave power generation apparatus refers to facilities that rotate a generator using a flux of waves, and produce electric energy through a rotary motion of the generator. To solve an issue of constructing a large-scale power plant in the ocean in view of an output fluctuation in wave energy, maritime countries having abundant wave resources are actively promoting the development of wave energy.

As a conventional art related to wave power generation, Korean Patent No. 10-1049518 discloses "Apparatus for wave power generation" that may drive a generator using a vertical motion of waves and convert the vertical motion into electric energy. When a buoyant body moves upward, a torque may be transmitted to a power transmitting shaft, whereby the wave power generation apparatus may generate a power. By configuring a power transmitting rope to be wound and restored by a return apparatus when the buoyant body moves downward, the wave power generation apparatus may generate a power continuously, and increase a structural stability irrespective of an external force by waves.

Further, Korean Patent Application Publication No. 2004-0026588 discloses "Device for generating electricity using waves" that may convert a vertical motion of a buoy into a unidirectional rotary motion through a power transmission interruption member of a power converter, produce and control a compressed air at a uniform pressure using the converted unidirectional rotary motion through a compressed air generator and a pressure controller, and produce electricity by supplying the compressed air to a generator.

However, power converting apparatuses applied to the conventional power generation apparatuses are mainly configured to efficiently convert a linear power in a vertical direction of a buoyant body into a rotation power. Thus, in a case in which a linear motion of the buoyant body occurs in a horizontal direction by waves, the power converting apparatuses may not convert the linear power into a rotation power, or a conversion efficiency may remarkably decrease and mechanical damage or fatigue may occur.

Further, there is a method in which a buoyant body corresponding to a power source is connected to a shaft with a rope, and when the rope is moved by the power source, the rope wound over the shaft is unwound and rotates the shaft, whereby a rotation power is obtained. In such a method, when a length of the rope runs out, a power may no longer be transmitted. To transmit a power iteratively, the moved rope is to be wound over the shaft again. Thus, a continuity of the power transmission may be lost, and a generation efficiency may decrease.

DISCLOSURE OF INVENTION

Technical Goals

To solve the foregoing issues of the conventional arts, an aspect of the present invention provides a power converting apparatus that may increase a generation efficiency by receiving a power from a power source, producing electricity by rotating an output shaft connected to a generator using a portion of the received power, accumulating a remaining portion of the received power in an energy storage device, and rotating the output shaft using the accumulated energy when a power is not transmitted from the power source, the power source that floats in the ocean, performs irregular motions in vertical and horizontal directions by waves within a predetermined range, and generates an intermittent linear power.

Technical Solutions

According to an aspect of the present invention, there is provided a power converting apparatus including a first tensile force transmitting member configured to transmit a tensile force generated in response to a linear motion of a linear power source; an input shaft including a first power transmitting member configured to be connected to the first tensile force transmitting member and rotate; an energy transmitting shaft including a second power transmitting member configured to be connected to the first power transmitting member and perform a rotary motion; an energy storage unit configured to be connected to the second power transmitting member, store an elastic energy or a potential energy in response to a unidirectional rotation of the second power transmitting member, and rotate the energy transmitting shaft using the stored elastic energy or the potential energy when a linear kinetic force generated by the buoyant body dissipates or decreases; an output shaft configured to rotate by receiving a torque alternately from the input shaft and the energy transmitting shaft; a first input device configured to transmit a torque of the input shaft to the output shaft; and a second input device configured to transmit a torque of the energy transmitting shaft to the output shaft.

Advantageous Effects

According to an embodiment of the present invention, a generation efficiency may considerably increase by receiving a power from a power source, producing electricity by rotating an output shaft connected to a generator using a portion of the received power, accumulating a remaining portion of the received power in an energy storage device, and rotating the output shaft using the accumulated energy when a power is not transmitted from a buoyant body, the power source that performs irregular motions within a predetermined range like the buoyant body floating in the ocean, and generates an intermittent linear power.

In particular, a power converting apparatus according to an embodiment of the present invention may connect a plurality of tensile force transmitting members to the buoyant body corresponding to the power source at predetermined angles, and efficiently transmit, to an input shaft, both a linear power occurring in a vertical direction and a linear power occurring in a horizontal direction by waves. Thus, a rotation power may be transmitted continuously to the output shaft to produce electricity.

BEST MODE FOR CARRYING OUT THE INVENTION

Hereinafter, preferred embodiments of a power converting apparatus according to the present invention will be described in detail with reference to the accompanying drawings.

Figure 1:
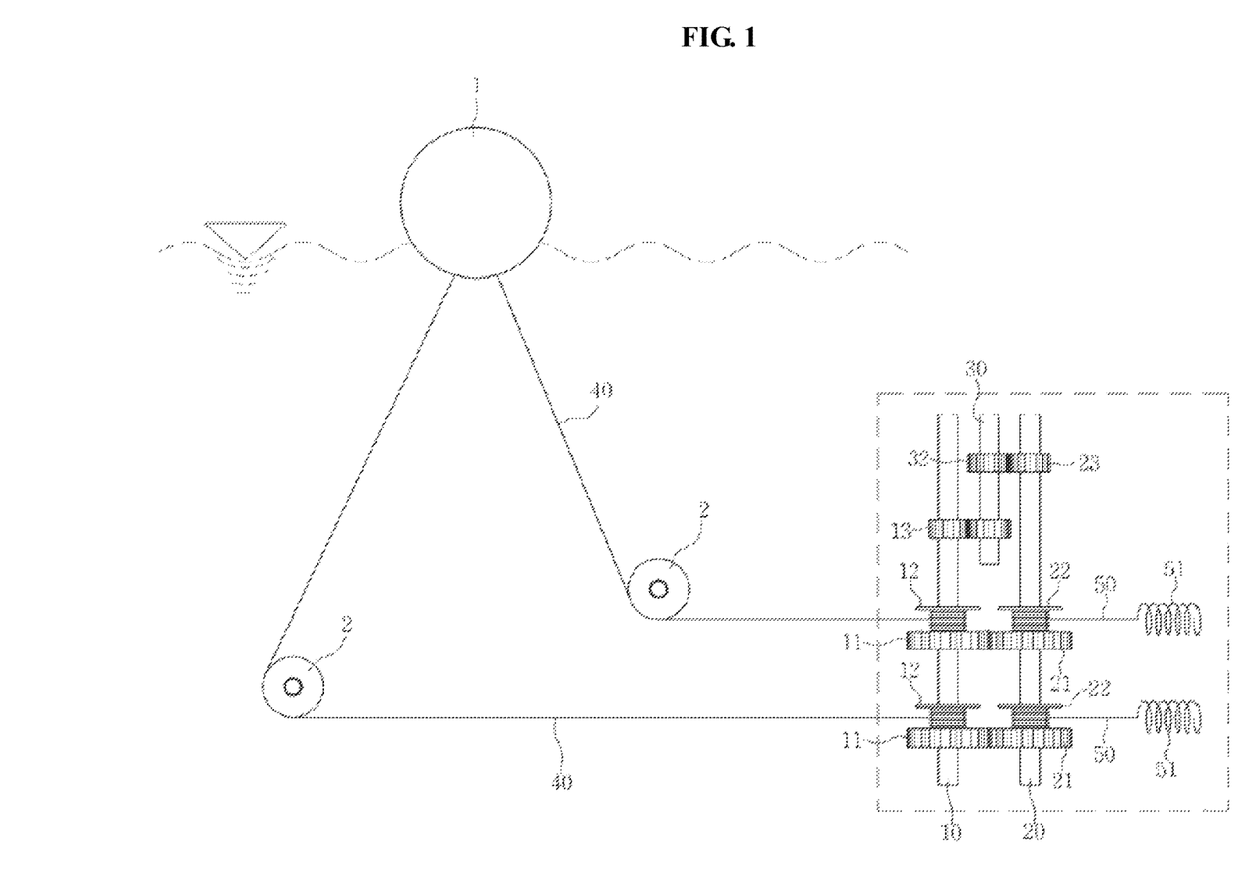
FIG. 1 illustrates a configuration of a power converting apparatus according to an embodiment of the present invention.
Figure 2:
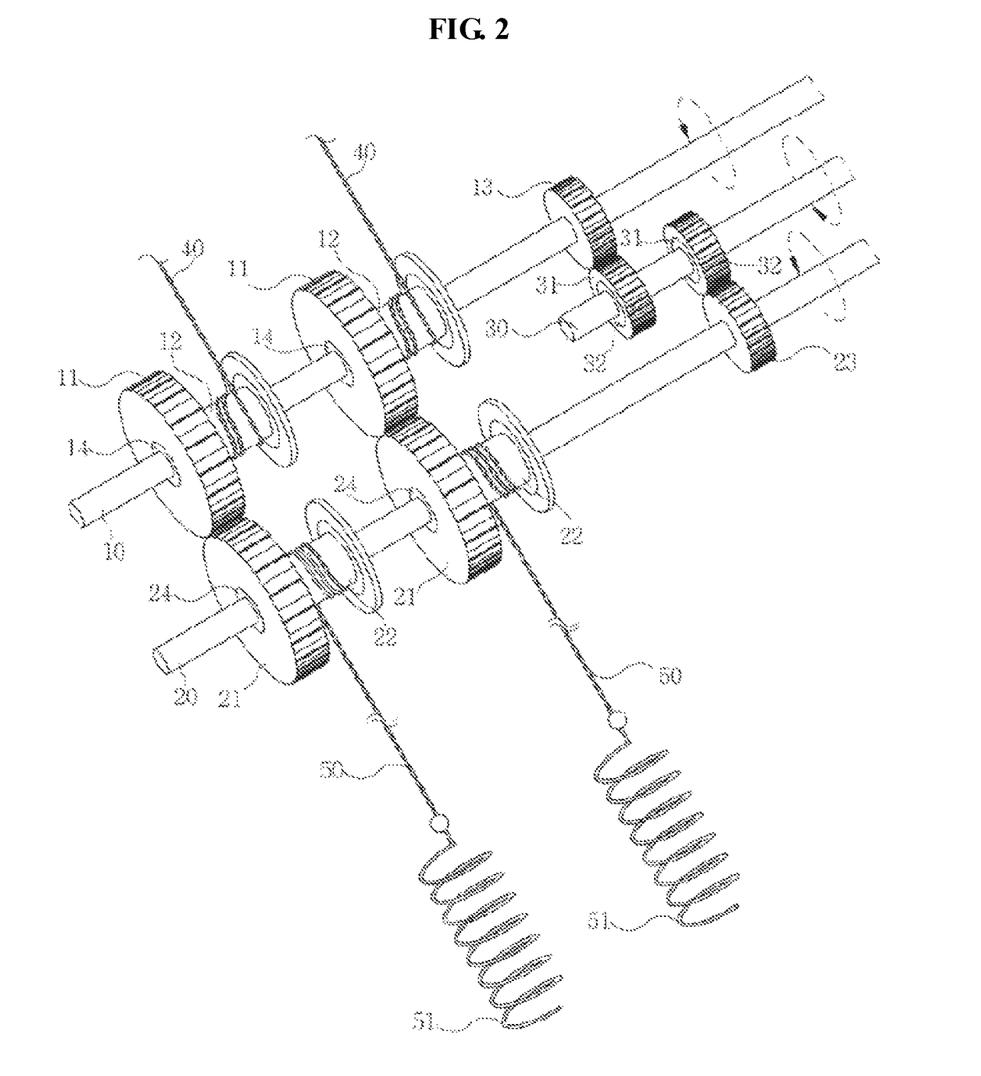
FIG. 2 is a perspective view illustrating the configuration of the power converting apparatus of FIG. 1.

Referring to FIGS. 1 and 2, a power converting apparatus according to an embodiment of the present invention includes a first tensile force transmitting member 40 configured to be connected to a buoyant body 1 that floats and performs a motion in the ocean and transmits a tensile force; an input shaft 10 configured to be connected to the first tensile force transmitting member 40 and perform a rotary motion by a tensile force transmitted by the first tensile force transmitting member 40; a first power transmitting member 11 configured to be coupled to the input shaft 10 through a unidirectional rotation member 14 that allows only a unidirectional rotation and rotate along with the input shaft 10 or rotate while idling with respect to the input shaft 10; an energy transmitting shaft 20 configured to be provided alongside the input shaft 10 and rotate; a second power transmitting member 21 configured to be coupled to the energy transmitting shaft 20 through a medium of a unidirectional rotation member 24 that allows only a unidirectional rotation, rotate along with the energy transmitting shaft 20 or rotate while idling with respect to the energy transmitting shaft 20, and be connected to the first power transmitting member 11 to receive a power from the first power transmitting member 11; a first input member 13 configured to be coupled to the input shaft 10 and rotate along with the input shaft 10; a second input member 23 configured to be coupled to the energy transmitting shaft 20 and rotate along with the energy transmitting shaft 20; an output shaft 30 configured to be provided alongside the input shaft 10 and the energy transmitting shaft 20 therebetween and rotate; a plurality of output members 31 configured to be coupled to the output shaft 30 through a unidirectional rotation member 32 that allows only a unidirectional rotation, be connected to the first input member 13 and the second input member 23, respectively, and receive a torque from the first input member 13 or the second input member 23; and an energy storage unit of which one end is connected to the energy transmitting shaft 20, the energy storage unit configured to store an elastic energy or a potential energy in response to a unidirectional rotation of the second power transmitting member 21, and rotate the energy transmitting shaft 20 using the stored elastic energy or the potential energy when a linear kinetic force generated by the buoyant body 1 dissipates or decreases.

The buoyant body 1 may be a linear power source that floats on a surface of the ocean or in the ocean and generates linear motions in vertical and horizontal directions by a flux of the seawater. To transmit a linear power to the input shaft 10 irrespective of a motion direction of the buoyant body 1, a plurality of first tensile force transmitting members 40 may be connected to the buoyant body 1 at predetermined intervals through direction changing members 2 such as, fixed pulleys, for example. Thus, the plurality of first tensile force transmitting members 40 connected to the buoyant body 1 may connect the buoyant body 1 to the input shaft 10 in different directions, for example, vectors. In this example, the plurality of first tensile force transmitting members 40 may be disposed preferably at intervals of 90 degrees.

The first tensile force transmitting member 40 may be configured by applying a rope, a wire, or a chain that may be mechanically flexible but not stretchable, thereby transmitting a tensile force effectively.

The input shaft 10 may be a constituent element configured to perform a rotary motion by receiving a linear power from the buoyant body 1. A plurality of first power transmitting members 11 may be provided on the input shaft 10 to receive power from the plurality of first tensile force transmitting members 40. A first drum 12 over which the first tensile force transmitting member 40 is wound or unwound may be provided to be fixed to each of the first power transmitting members 11. The first drum 12 may be configured to rotate along with the first power transmitting member 11.

The first power transmitting member 11 may be coupled to the input shaft 10 through the unidirectional rotation member 14 that allows only a unidirectional rotation. The unidirectional rotation member 14 may be configured using a one-way clutch bearing, a ratchet gear, and the like. In the present embodiment, the unidirectional rotation member 14 may allow only a clockwise rotation. Thus, when the first tensile force transmitting member 40 is unwound from the first drum 12, the unidirectional rotation member 14 may restrict the first power transmitting member 11 and the input shaft 10, whereby the first power transmitting member 11 and the input shaft 10 may rotate together.

The energy transmitting shaft 20 may be provided alongside the input shaft 10, and receive a power from the input shaft 10 through the second power transmitting member 21 connected to the first power transmitting member 11. A second drum 22 may be coupled to the second power transmitting member 21, whereby the second power transmitting member 21 and the second drum 22 may rotate together. A second tensile force transmitting member 50 configured to be connected to the energy storage unit and transmit a tensile force may be wound or unwound over the second drum 22.

Similar to the first tensile force transmitting member 40, the second tensile force transmitting member 50 may be configured by applying a rope, a wire, or a chain that may be mechanically flexible but not stretchable, thereby transmitting a tensile force effectively.

Similar to the first power transmitting member 11, the second power transmitting member 21 may be connected to the energy transmitting shaft 20 through the unidirectional rotation member 24 configured using a one-way clutch bearing, a ratchet gear, and the like. In the present embodiment, the unidirectional rotation member 24 may be configured to have a load rotation direction identical to that of the unidirectional rotation member 14 coupled to the first power transmitting member 11. In detail, the unidirectional rotation member 24 may allow a clockwise rotation and allow a counterclockwise rotation. Thus, when the second power transmitting member 21 rotates by receiving a power from the first power transmitting member 11, the second power transmitting member 21 may rotate relatively freely with respect to the energy transmitting shaft 20. Conversely, when the second power transmitting member 21 rotates counterclockwise by receiving energy from the energy storage unit, the unidirectional rotation member 24 may restrict the energy transmitting shaft 20 and the second power transmitting member 21, whereby the energy transmitting shaft 20 and the second power transmitting member 21 may rotate together.

In the present embodiment, the first power transmitting member 11 and the second power transmitting member 21 may be configured using gears, however, may also be configured using various known power transmitting mechanisms such as a pulley and belt system, a sprocket and chain system, and a link mechanism, for example. The first power transmitting member 11 and the second power transmitting member 21 may be configured using gears having equal numbers of gear teeth. However, a gear ratio of the first power transmitting member 11 to the second power transmitting member 21 may be appropriately adjusted to transmit energy efficiently.

The output shaft 30 may be provided alongside the input shaft 10 and the energy transmitting shaft 20 therebetween, and rotate by receiving a power alternately from the input shaft 10 and the energy transmitting shaft 20. The output shaft 30 may be connected directly or indirectly to a generator (not shown) configured to generate electricity.

To transmit a power from the input shaft 10 and the energy transmitting shaft 20 to the output shaft 30, the first input member 13 may be fixed to the input shaft 10 and rotate along with the input shaft 10, and the second input member 23 may be fixed to the energy transmitting shaft 20 and rotate along with the energy transmitting shaft 20. Further, the plurality of output members 31, for example, two output members 31 in the present embodiment, configured to be coupled to the first input member 13 and the second input member 23, respectively, and receive torques, may be coupled to the output shaft 30 through the unidirectional rotation members 32 such as, one-way clutch bearings, respectively.

In the present embodiment, the first input member 13, the second input member 23, and the output member 31 may be configured using gears. However, the first input member 13, the second input member 23, and the output member 31 may also be configured using various known power transmitting systems such as a pulley and belt system, and a sprocket and chain system, for example.

The unidirectional rotation members 32 coupled to the output shaft 30 may have identical load rotation directions. In detail, the unidirectional rotation members 32 may be configured to prevent a clockwise rotation and allow a counterclockwise rotation. The unidirectional rotation members 32 may also be configured to using one-way clutch bearings, ratchet gears, and the like.

The energy storage unit may be connected to the energy transmitting shaft 20 through a medium of the second tensile force transmitting member 50 connected to the second drum 22, and configured to store energy and supply the stored energy. In the present embodiment, the energy storage unit may be configured using a spring 51 configured to be connected to the second tensile force transmitting member 50 and accumulate an elastic energy in response to the second tensile force transmitting member 50 being wound over the second drum 22. A coil spring, a flat spring, a spiral spring, and the like may be applicable as the spring 51. In the present embodiment, a coil spring is utilized. The spring 51 may accumulate an elastic force while stretching in response to the second tensile force transmitting member 50 being wound over the second drum 22, and transmit the energy by pulling the second tensile force transmitting member 50 and rotating the second drum 22 while shrinking.

The power converting apparatus configured as described above may operate as follows.

When the buoyant body 1 moves in a predetermined direction, for example, a vertical direction or a horizontal direction, by waves, a tensile force of a rope or wire corresponding to the first tensile force transmitting member 40 may increase, and the first tensile force transmitting member 40 may be unwound from the first drum 12, which may cause a rotary motion, for example, a counterclockwise rotary motion, of the first drum 12. Thus, the first power transmitting member 11, for example, a gear in the present embodiment, provided as an integral body with the first drum 12 may rotate counterclockwise at an angular velocity equal to that of the first drum 12.

The unidirectional rotation member 14 disposed between the first power transmitting member 11 and the input shaft 10 may restrict a counterclockwise motion and thus, the first power transmitting member 11 and the input shaft 10 may rotate together. A portion of a torque of the first power transmitting member 11 may be used to rotate the input shaft 10, and a remaining portion of the torque may be used to relatively rotate the second power transmitting member 21 connected to the first power transmitting member 11, and the second drum 22 with respect to the energy transmitting shaft 20 so that the second tensile force transmitting member 50 may be wound over the second drum 22, whereby the spring 51 of the energy storage unit may stretch to store an elastic energy.

A torque of the input shaft 10 may be transmitted to the output shaft 30 through the first input member 13 and the output member 31 connected to the first input member 13, whereby the output shaft 30 may rotate in one direction, for example, clockwise in the present embodiment.

When the buoyant body 1 configured to generate a linear power is unable to perform a linear motion or when a tensile force of the first tensile force transmitting member 40 decreases, the elastic energy stored in the spring 51 of the energy storage unit may be converted into a tensile force of the second tensile force transmitting member 50 and thus, the second drum 22 and the second power transmitting member provided as an integral body with the second drum 22 may perform counterclockwise rotary motions. The energy received from the spring 51 may be used as a rotation power of the energy transmitting shaft 20 connected through the unidirectional rotation member 24.

A counterclockwise torque of the energy transmitting shaft 20 may be transmitted to the output shaft 30 through the second input member 23 and the output member 31 connected to the second input member 23, and used to rotate the output shaft 30.

When the elastic energy is transmitted from the spring 51 to the second power transmitting member 21 and the second power transmitting member 21 rotates counterclockwise, the first power transmitting member 11 may rotate clockwise. Since the unidirectional rotation member 14 connected to an inner side of the first power transmitting member 11 allows a clockwise rotation, a torque of the second power transmitting member 21 may not be transmitted to the input shaft 10, and the first power transmitting member 11 and the first drum 12 may wind the first tensile force transmitting member 40 while idling with respect to the input shaft 10.

As described above, when a tensile force is applied to one of the plurality of first tensile force transmitting members 40 by a motion of the buoyant body 1, and the first drum 12 and the first power transmitting member 11 rotate, a portion of a power transmitted by the first tensile force transmitting member 40 may be converted to a torque of the input shaft 10, and a remaining portion of the power may be transmitted to the energy storage unit through the second power transmitting member 21 and the second tensile force transmitting member 50 and accumulated as an elastic energy.

When a power transmitted from the buoyant body 1 is absent or remarkably decreases, the elastic energy accumulated in the energy storage unit may be transmitted to the output shaft 30 through the energy transmitting shaft 20, whereby the output shaft 30 may rotate.

Thus, the output shaft 30 may continuously perform rotary motions while receiving a power alternately from the input shaft 10 and the energy transmitting shaft 20, whereby a generation efficiency may significantly increase.

In the present embodiment, the plurality of first tensile force transmitting members 40 may be connected to the buoyant body 1, and the plurality of first power transmitting members 11 and the plurality of first drums 12 separately connected to the first tensile force transmitting members 40, respectively, may be provided on the input shaft 10. The plurality of second power transmitting members 21 connected to the plurality of first power transmitting members 11 may be provided on the energy transmitting shaft 20, the second drums 22 may be fixed to the second power transmitting members 21, respectively, and the plurality of second drums 22 may be configured to be connected to the plurality of energy storage members 51 through the plurality of second tensile force transmitting members 50. Conversely, a single first tensile force transmitting member 40, a single first power transmitting member 11, a single first drum 12, a single second power transmitting member 21, and a single second drum 22 may be configured.

Although the energy storage unit corresponding to the spring 51 configured to store an elastic energy is provided as an example in the foregoing embodiment, the energy storage unit may be configured using a weight configured to be connected to the second tensile force transmitting member 50 and store a potential energy.

Figure 3:
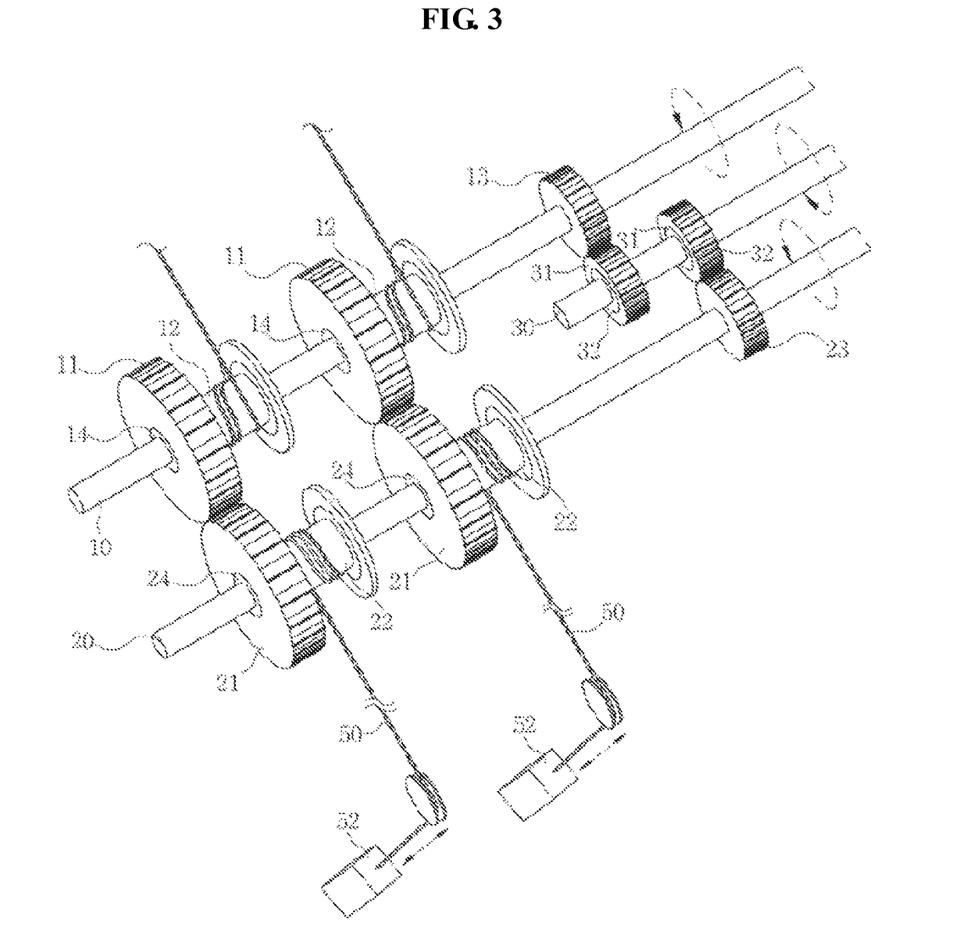
FIG. 3 illustrates a configuration of a power converting apparatus according to another embodiment of the present invention.

In detail, as shown in FIG. 3, the energy storage unit may be configured using a weight 52 that is connected to the second tensile force transmitting member 50 and accumulates a potential energy while moving upward in response to the second tensile force transmitting member 50 being wound over the second drum 22.

When a power transmitted from the buoyant body 1 is absent or remarkably decreases, the weight 52 may fall downward, thereby rotating the second drum 22, rotating the energy transmitting shaft 20, and rotating the output shaft 30.

When an excessive load is applied to the first tensile force transmitting member 40 connected to the buoyant body 1, the first drum 12, the first power transmitting member 11, the input shaft 10, and the like by a sudden motion of the buoyant body 1, the foregoing constituent elements or the entire system of a power transmitting apparatus may be damaged.

Figure 4:
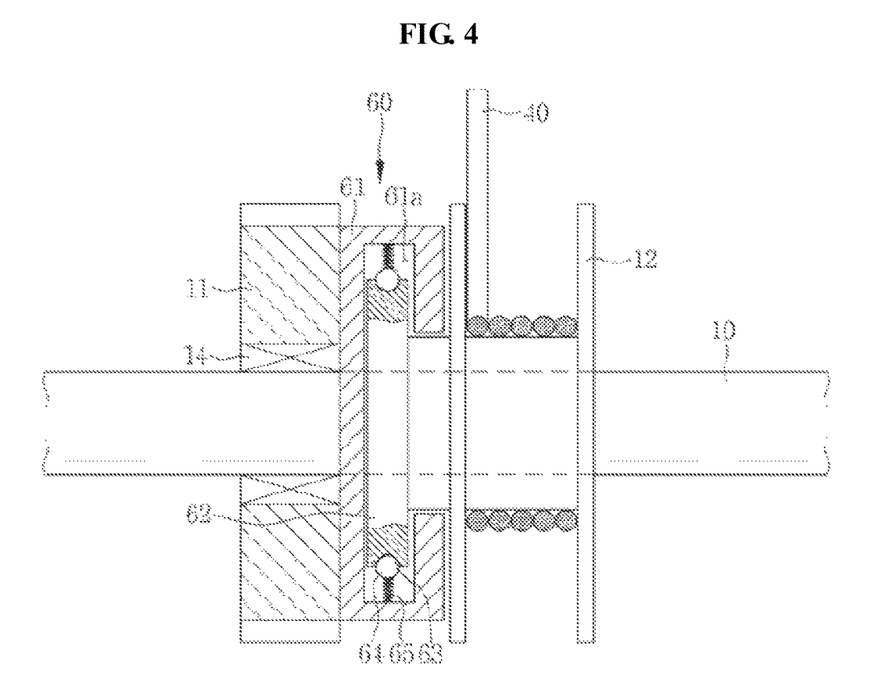
FIG. 4 is a cross-sectional view illustrating a decoupling structure of a power converting apparatus according to another embodiment of the present invention.
Figure 5:
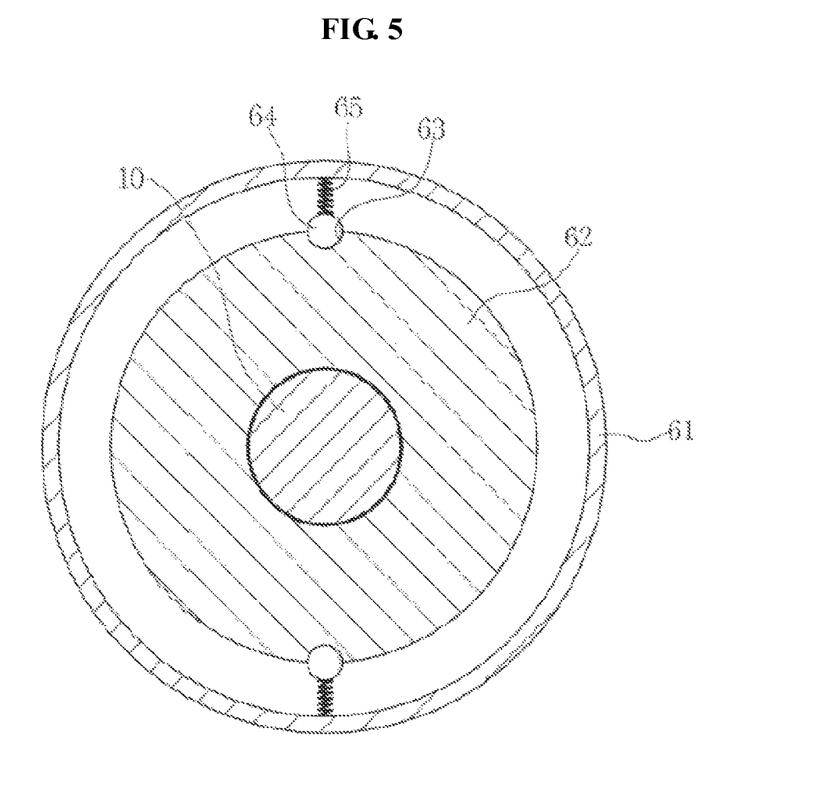
FIG. 5 is a cross-sectional view illustrating the decoupling structure of FIG. 4, cut and viewed from another side.

Accordingly, as shown in FIGS. 4 and 5, a decoupler 60 may be configured between the first power transmitting member 11 and the first drum 12 receiving a linear power from the buoyant body 1. When an excessive load is transmitted from the first tensile force transmitting member 40, the decoupler 60 may block a power transmission from the first drum 12 to the first power transmitting member 11, whereby the entire configuration of the power transmitting apparatus may be protected.

The decoupler 60 shown in FIGS. 4 and 5 includes a housing 61 configured to be fixed to the first power transmitting member 11 and in which a receiving space 61a is provided, a coupling disk 62 configured to be fixed to one side surface of the first drum 12, inserted into an internal portion of the housing 61, and in which a fixing groove 63 is provided to be concave on an outer circumferential surface thereof, a ball 64 provided in the internal portion of the housing 61, and configured to be inserted into the fixing groove 63, and a spring 65 provided in the internal portion of the housing 61, and configured to elastically pressurize the ball 64 toward the coupling disk 62.

Thus, the ball 64 may be typically elastically inserted into the fixing groove 63 of the coupling disk 62, a coupling state between the coupling disk 62 and the housing 61 may be maintained, and the first drum 12 may be fixed to the first power transmitting member 11. When an excessive tensile force greater than or equal to a set value is transmitted through the first tensile force transmitting member 40 by a sudden motion of the buoyant body 1, the ball 64 may be separated from the fixing groove 63 of the coupling disk 62, the coupling state between the coupling disk 62 and the housing 61 may be cancelled, and the coupling disk 62 may idle on an inner side of the housing 61, whereby the power transmission may be blocked.

By the configuration of the decoupler 60 as described above, damage to constituent elements to be caused by an excessive load may be prevented, and a stable power transmitting system may be implemented.

In the foregoing embodiment, the first power transmitting member 11 may be coupled to the input shaft 10 through the unidirectional rotation member 14 that allows only a unidirectional rotation. Conversely, the first power transmitting member 11 may be coupled to the input shaft 10 by a known decoupler that prevents a power transmission from the first power transmitting member 11 to the input shaft 10 when a tensile force greater than or equal to a set value is applied from the first tensile force transmitting member 40, in turn preventing damage to constituent elements to be caused by an excessive load.

Further, in the foregoing embodiment, a single input shaft 10, a single energy transmitting shaft 20, and a single output shaft 30 are configured, and the output shaft 30 may receive power from the single input shaft 10 and the single energy transmitting shaft 20. Conversely, a plurality of input shafts 10 and a plurality of energy transmitting shafts 20 may be configured, a single output shaft 30 may be configured, and the single output shaft 30 may receive power from the plurality of input shafts 10 and the plurality of energy transmitting shafts 20 and rotate, thereby performing a wave power generation. In this example, when rotation power is received from the input shafts 10 and the energy transmitting shafts 20 in different periods, the output shaft 30 may have a uniform rotation velocity. Thus, in a wave power generation system that produces electricity by waves with long occurrence periods, a number of rotations of a generator connected to the output shaft 30 may be maintained to be uniform, and stable generation of electricity may be achieved.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

The present application may be applicable to an apparatus that may generate a rotation power from a linear power source that generates a linear power, for example, a wave power generation apparatus.

What is claimed is:

1. A power converting apparatus comprising:
a buoyant body (1) configured to float on a surface of, or in, an ocean that contains sea water, and generates linear motion in vertical and horizontal directions by a flux of the sea water;
a plurality of first tensile force transmitting members (40) configured to transmit a tensile force generated in response to a linear motion of the buoyant body (1), each of the plurality of first tensile force transmitting members (40) connected to a different portion of the buoyant body (1);
an input shaft (10) comprising a first power transmitting member (11) configured to be connected to the plurality of first tensile force transmitting members (40) and to rotate;
an energy transmitting shaft (20) comprising a second power transmitting member (21) configured to be connected to the first power transmitting member (11) and perform a rotary motion;
an energy storage unit configured to be connected to the second power transmitting member (21), store an elastic energy or a potential energy in response to a unidirectional rotation of the second power transmitting member (21), and rotate the energy transmitting shaft (20) using the stored elastic energy or the potential energy when a linear kinetic force generated by the linear power source dissipates or decreases;
an output shaft (30) configured to rotate by receiving a torque alternately from the input shaft (10) and the energy transmitting shaft (20);
a first input device configured to transmit a torque of the input shaft (10) to the output shaft (30); and
a second input device configured to transmit a torque of the energy transmitting shaft (20) to the output shaft (30), and
wherein each of the plurality of first tensile force transmitting members (40) that is connected to the buoyant body (1) is configured to connect the buoyant body (1) to the input shaft in different vectors.

2. The power converting apparatus of claim 1, wherein the first power transmitting member (11) is coupled to the input shaft (10) through a first unidirectional rotation member (14) configured to allow only a unidirectional rotation, and the second power transmitting member (21) is coupled to the energy transmitting shaft (20) through a second unidirectional rotation member (24) configured to allow the same unidirectional rotation as the first unidirectional rotation member (14).

3. The power converting apparatus of claim 2, wherein a first drum (12) over which the plurality of first tensile force transmitting members (40) is wound or unwound is provided on the input shaft (10) and fixed to the first power transmitting member (11) to rotate along with the first power transmitting member (11), a second drum (22) is provided on the energy transmitting shaft (20) and fixed to the second power transmitting member (21) to rotate along with the second power transmitting member (21), and a second tensile force transmitting member (50) configured to be connected to the energy storage unit and transmit a tensile force is wound or unwound over the second drum (22).

4. The power converting apparatus of claim 3, wherein the energy storage unit comprises a spring configured to be connected to the second tensile force transmitting member (50) and accumulate an elastic energy in response to the second tensile force transmitting member (50) being wound over the second drum (22).

5. The power converting apparatus of claim 3, wherein the energy storage unit comprises a weight configured to be connected to the second tensile force transmitting member (50) and accumulate a potential energy while moving upward in response to the second tensile force transmitting member (50) being wound over the second drum (22).

6. The power converting apparatus of claim 3, wherein a decoupler (60) is provided between the first power transmitting member (11) and the first drum (12) to decouple the first power transmitting member (11) from the first drum (12) when a tensile force greater than or equal to a set value is applied from the plurality of first tensile force transmitting members (40).

7. The power converting apparatus of claim 6, wherein the decoupler (60) comprises a housing (61) configured to be fixed to the first power transmitting member (11) and in which a receiving space (61a) is provided, a coupling disk (62) configured to be fixed to one side surface of the first drum (12), inserted into an internal portion of the housing (61), and in which a fixing groove (63) is provided to be concave on an outer circumferential surface thereof, a ball (64) provided in the internal portion of the housing (61), and configured to be inserted into the fixing groove (63), and a spring (65) provided in the internal portion of the housing (61), and configured to elastically pressurize the ball (64) toward the coupling disk (62).

8. The power converting apparatus of claim 1, wherein a plurality of first power transmitting members (11) are provided on the input shaft (10), and the plurality of first tensile force transmitting members (40) connected to the plurality of first power transmitting members (11) are connected to the linear power source to be spaced apart from each other through direction changing members (2).

9. The power converting apparatus of claim 1, wherein the first input device comprises a first input member (13) configured to be coupled to the input shaft (10) and rotate along with the input shaft (10), and a first output member (31) configured to be coupled to the output shaft (30) through a first unidirectional rotation member (32) that allows only a unidirectional rotation, and connected to the first input member (13) to receive a torque, and
the second input device comprises a second input member (23) configured to be coupled to the energy transmitting shaft (20) and rotate along with the energy transmitting shaft (20), and a second output member (31) configured to be coupled to the output shaft (30) through a second unidirectional rotation member (32) that allows only a unidirectional rotation, and connected to the second input member (23) to receive a torque.

10. The power converting apparatus of claim 1, wherein the first power transmitting member (11) is coupled to the input shaft (10) by a decoupler configured to be decoupled from the input shaft (10) and prevent a power transmission from the first power transmitting member (11) to the input shaft (10) when a tensile force greater than or equal to a set value is applied from the plurality of first tensile force transmitting members (40).

11. The power converting apparatus of claim 1, wherein the output shaft (30) is configured to receive power from a plurality of input shafts comprising the input shaft (10) and a plurality of energy transmitting shafts comprising the energy transmitting shaft (20).

* * * * *